United States Patent
Villa

(10) Patent No.: US 6,938,381 B1
(45) Date of Patent: Sep. 6, 2005

(54) CATASTROPHIC EVENT SURVIVAL STRUCTURE AND METHOD OF MANUFACTURE

(76) Inventor: Jorge Enrique Villa, 15195 SW. 108 Ter., Miami, FL (US) 33196

(*) Notice: Subject to any disclaimer, the term of this patent is extended or adjusted under 35 U.S.C. 154(b) by 138 days.

(21) Appl. No.: 10/084,690

(22) Filed: Feb. 27, 2002

(51) Int. Cl.$^7$ .............................. E04H 9/00; E04B 1/32
(52) U.S. Cl. ........................ 52/79.1; 52/79.4; 52/79.14; 52/80.1; 52/81.6
(58) Field of Search .................... 52/79.1, 79.4, 52/79.8, 79.12, 80.1, 81.6, 169.6, 79.11, 79.14

(56) References Cited

U.S. PATENT DOCUMENTS

| | | | | |
|---|---|---|---|---|
| 926,674 | A | * 6/1909 | Mills | 137/209 |
| 2,388,701 | A | * 11/1945 | Neff | 264/32 |
| 2,967,494 | A | * 1/1961 | Rosenfeld | 109/1 S |
| 3,129,648 | A | * 4/1964 | Hoff | 454/194 |
| 3,164,111 | A | * 1/1965 | Lanni | 109/1 S |
| 3,251,159 | A | * 5/1966 | Trice | 52/20 |
| 3,320,969 | A | * 5/1967 | Gordon | 52/81.6 |
| 3,365,855 | A | * 1/1968 | Vermette | 52/745.07 |
| 3,909,992 | A | * 10/1975 | Stachiw | 52/2.15 |
| 3,968,190 | A | * 7/1976 | Stewart | 264/32 |
| 4,126,972 | A | * 11/1978 | Silen | 52/34 |
| 4,228,788 | A | * 10/1980 | Moeser | 123/437 |
| 4,299,066 | A | * 11/1981 | Thompson | 52/81.6 |
| 4,514,347 | A | * 4/1985 | Reed | 264/32 |
| 4,672,779 | A | * 6/1987 | Boyd | 52/79.4 |
| 4,843,788 | A | * 7/1989 | Gavin et al. | 52/205 |
| 4,955,166 | A | * 9/1990 | Qualline | 52/169.6 |
| 5,033,243 | A | * 7/1991 | Worms et al. | 52/245 |
| 5,326,328 | A | * 7/1994 | Robinson | 472/136 |
| 5,376,315 | A | 12/1994 | Fricke | |
| 5,671,568 | A | 9/1997 | Armanno, Sr. | |
| 5,794,389 | A | 8/1998 | Vysma | |
| 5,829,208 | A | 11/1998 | Townley | |
| 5,860,262 | A | 1/1999 | Johnson | |
| 5,921,043 | A | * 7/1999 | McDonald | 52/309.9 |
| 5,953,866 | A | 9/1999 | Poole | |
| 5,979,121 | A | 11/1999 | Bennington | |
| 6,067,889 | A | 5/2000 | Brown | |
| 6,085,475 | A | 7/2000 | Parks et al. | |
| 6,131,343 | A | 10/2000 | Jackson, Jr. | |
| 6,151,841 | A | 11/2000 | Green | |
| 6,161,345 | A | 12/2000 | Hope et al. | |
| 6,260,312 | B1 | 7/2001 | Spene et al. | |
| 6,263,637 | B1 | 7/2001 | Spene et al. | |
| 6,266,863 | B1 | 7/2001 | Spene et al. | |
| 6,308,466 | B1 | * 10/2001 | Moriarty | 52/79.5 |
| 6,334,278 | B1 | 1/2002 | Arnold | |
| 6,385,919 | B1 | * 5/2002 | McCarthy | 52/169.6 |
| 6,434,896 | B1 | * 8/2002 | Mitchell | 52/169.6 |
| 6,438,906 | B1 | * 8/2002 | Komarowski et al. | 52/169.1 |

FOREIGN PATENT DOCUMENTS

WO    WO 88/05488    * 7/1988

* cited by examiner

*Primary Examiner*—Jeanette Chapman
(74) *Attorney, Agent, or Firm*—Brian S. Steinberger; Law Offices of Brian S. Steinberger, P.A.

(57) ABSTRACT

A catastrophic event survival structure and method of manufacture such that the catastrophic event survival structure includes a monolithic outer shell formed from a single pour of concrete and enclosing a confined inner space therein. The monolithic outer shell of the catastrophic event survival structure is configured to withstand substantial wind and projectile impact forces and includes a door to permit resealable access to the confined inner space.

19 Claims, 6 Drawing Sheets

CATASTROPHIC EVENT SURVIVAL STRUCTURE AND METHOD OF MANUFACTURE

BACKGROUND OF THE INVENTION

1. Field of the Invention

The present invention relates generally to safety structures and more particularly to a catastrophic event survival structure configured to withstand substantial wind and projectile impact forces in order to ensure the safety of occupants and/or contents located therein.

2. Description of the Prior Art

Natural disasters such as hurricanes, tornadoes, and earthquakes, for example, are well known to cause tragic, and many times, preventable loss of life as well as devastating damage to property and valuables. In addition to severe weather-related events such as these, however, a myriad of man-made catastrophes regularly lead to severe injury and even death. Such man-made catastrophes range from organized military actions such as artillery fire and bombing activities, to civilian riots, and accidental events including auto and aviation disasters, to name a few illustrative examples.

Many man-made and natural catastrophes involve excessive wind loading, lift, shear, and projectile impact forces and are easily capable of completely destroying all but the most durable habitable structures that fall within the zone of danger. Hurricanes and tornadoes, to focus on two natural disasters, are known to generate wind forces of up to 200 miles per hour and can hurl heavy debris and projectiles, such as an automobile, for example, into a structure such as a residential, commercial, or military building with devastating and tragic consequences.

In the past, a number of shelters have been developed in an effort to protect against personal injury and damage to property and valuables resulting from the effects of natural disasters such as tornadoes. Unfortunately, however, existing solutions have generally focused upon permanently located structures requiring substantial ground clearing and construction to be done on location. Existing shelters, unfortunately, lack the requisite structural integrity to withstand a severe calamity and compensate for weak structural form by requiring underground installation. Along these lines, many existing shelters are relatively lightweight and require that a complex and burdensome anchoring system be implemented to safely secure them in place. Such anchoring systems have proven very difficult and time-consuming to construct and often require anchoring to virgin bedrock in order to prevent movement.

In an effort to overcome these deficiencies, a number of structures have been formed of high-strength concrete. Although these structures are heavier than their fiberglass, steel, and aluminum counterparts, they have not generally been successful in maximizing the design for improved aerodynamic shape, wind and lift force resistance, and projectile impact durability. Existing concrete structures have generally followed the building practices prevalent in the construction of ordinary residential and commercial buildings such as homes, apartments, stores, offices, and the like. As such, they are typically formed with generally right angles at the corners and edges and utilize a number of joints formed within the concrete structure during construction. These separately joined areas of concrete are typically the first points of failure in the event of a significant natural or man-made catastrophe and are particularly susceptible to failure during impact.

Many existing concrete structures require that a substantial amount of construction be done on-location and are not readily portable once built. As such, they cannot be deployed quickly and efficiently for use in emergency situations such as, for example, during a military raid or other strategically timed operation where quick response and set-up time for the structure is critical.

Accordingly, there is an established need for a catastrophic event survival structure and method of manufacture solving the aforementioned problems and configured to withstand substantial wind velocity and projectile impact forces such as those commonly encountered, for example, during natural and man-made catastrophes so as to ensure the safety of occupants and/or valuables located therein.

SUMMARY OF THE INVENTION

The present invention is directed to a catastrophic event survival structure configured to withstand substantial wind and projectile impact forces such as those commonly encountered, for example, during natural and man-made catastrophes and events including tornadoes, hurricanes, earthquakes, artillery fire, bombing activity, military action, and auto and aviation accidents.

An object of the present invention is to provide a catastrophic event survival structure having a substantially strong monolithic outer shell.

A further object of the present invention is to provide a catastrophic event survival structure formed from a single continuous pour of concrete.

Yet another object of the present invention is to provide a catastrophic event survival structure that is aerodynamic in shape.

A further object of the present invention is to provide a catastrophic event survival structure that is substantially portable in design and can be quickly and easily deployed where needed.

Another object of the present invention is to provide a catastrophic event survival structure that can be configured either below the ground elevation, at the ground elevation, above the ground elevation, and even submerged under water.

An additional object of the present invention is to provide a catastrophic event survival structure that is formed of concrete lacking any joints therein.

Another object of the present invention is to provide a catastrophic event survival structure configured to withstand a variety of high velocity wind and projectile impact forces.

An additional object of the present invention is to provide a catastrophic event survival structure formed as a generally spherical polyhedron for increased strength and impact durability.

In accordance with a first aspect of the invention, a catastrophic event survival structure is provided including a monolithic outer shell formed from a single pour of concrete and substantially enclosing a confined inner space therein. The monolithic outer shell is formed as a generally spherical polyhedron structured to withstand substantial wind and projectile impact forces thereupon and having a door to provide resealable access to the confined inner space.

These and other objects, features, and advantages of the present invention will become more readily apparent from the attached drawings and the detailed description of the preferred embodiments, which follow.

BRIEF DESCRIPTION OF THE DRAWING

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION OF THE PREFERRED EMBODIMENTS

Shown throughout the figures, the present invention is generally directed towards a catastrophic event survival structure configured to withstand substantial wind velocity and projectile impact forces such as those commonly encountered during natural and man-made catastrophes. Such natural and man-made catastrophic events may include, for example, hurricanes, tornadoes, earthquakes, meteorite showers, armillary fire, bombing activity, military action, riots, explosions, and auto and aviation accidents, to name a few illustrative examples.

Figure 1:
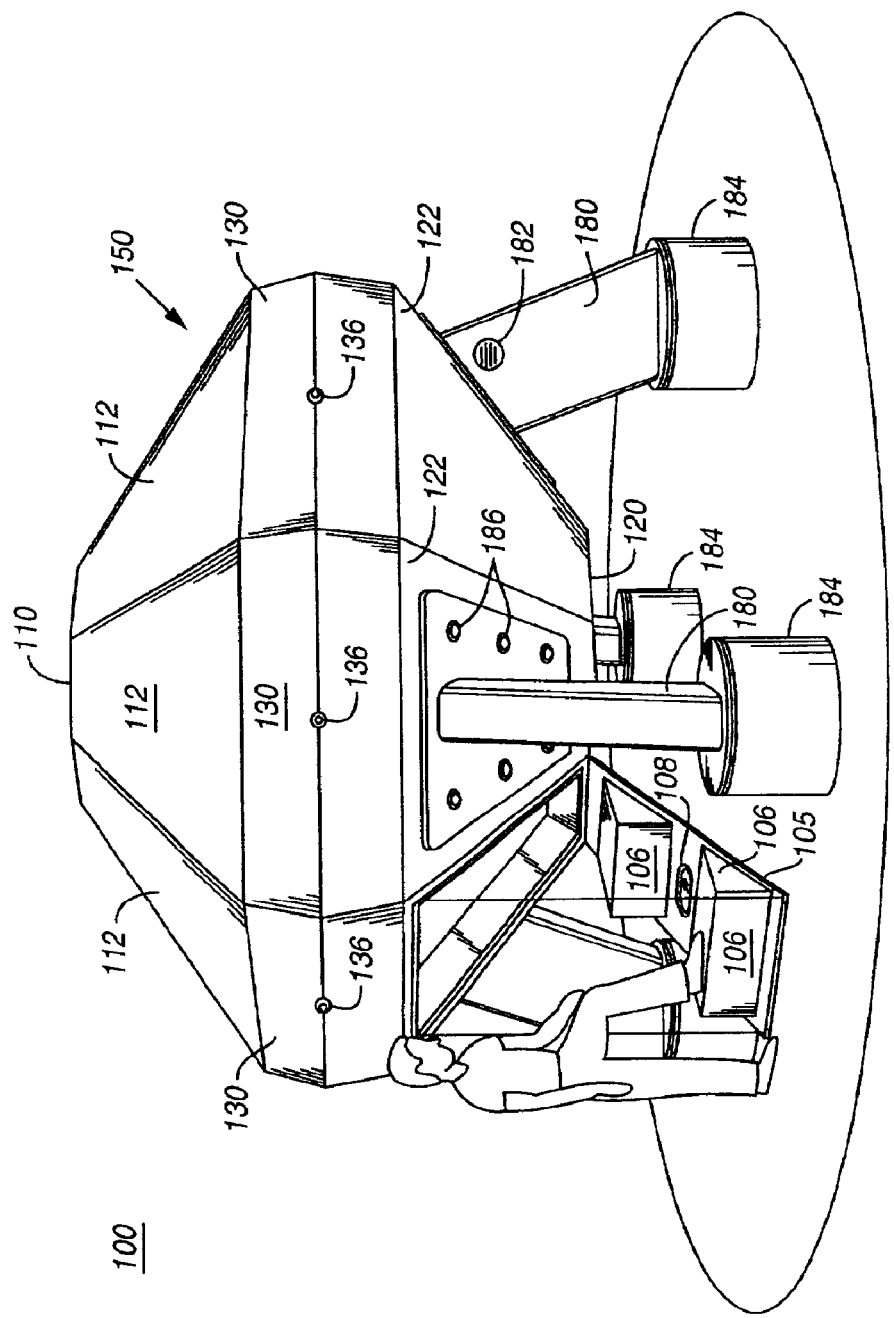
FIG. 1 is a perspective view of the catastrophic event survival structure in accordance with an exemplary embodiment of the present invention.
Figure 2:
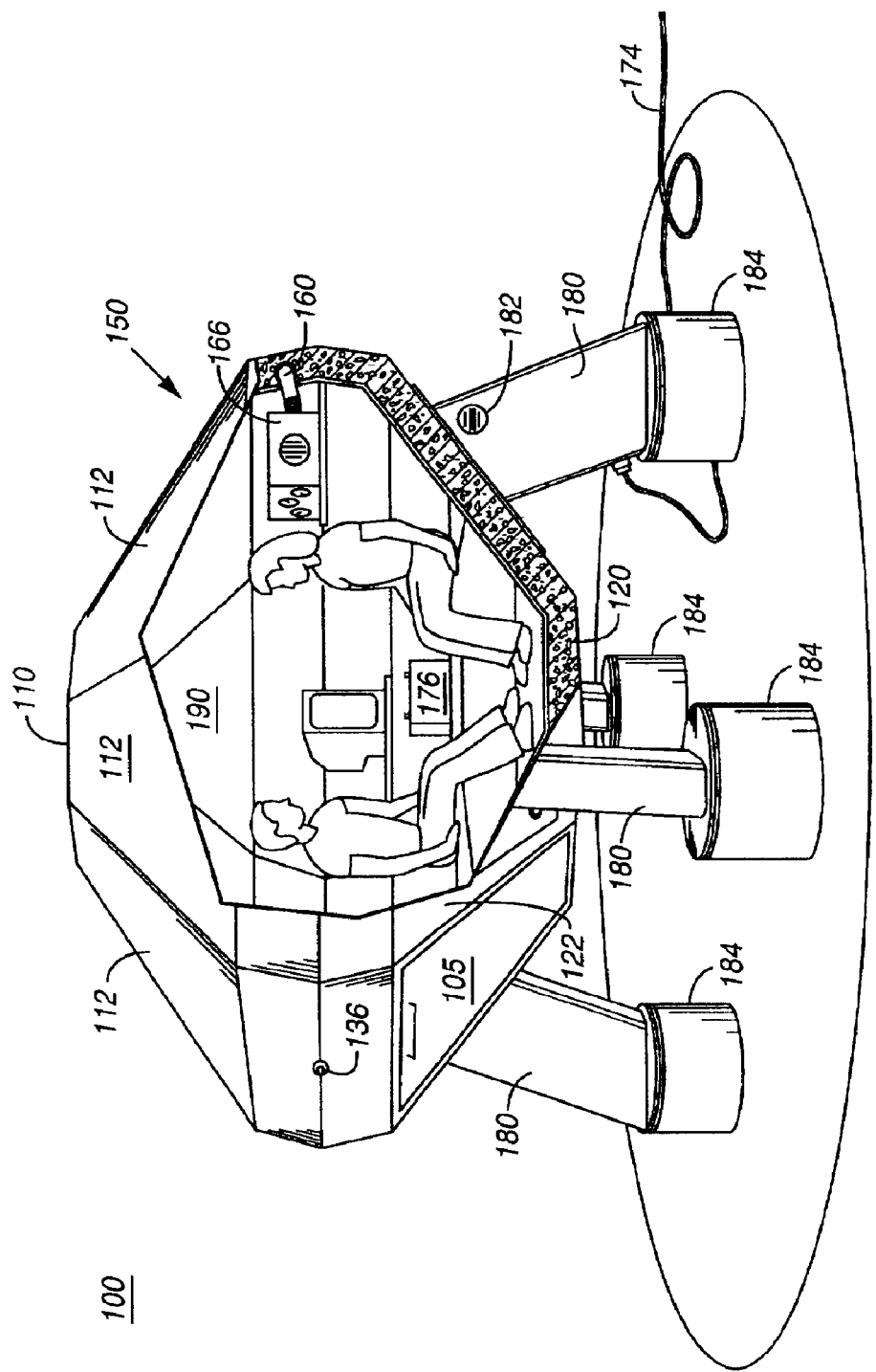
FIG. 2 is a perspective view of the catastrophic event survival structure in accordance with an exemplary embodiment of the present invention showing a partial cross-section thereof.

The preferred embodiment of the catastrophic event survival structure 100 of the present invention is shown in perspective view in FIGS. 1 and 2. FIG. 1 illustrates the catastrophic event survival structure 100 with the door 105 in an open position. FIG. 2 is a partial cross-sectional view showing the catastrophic event survival structure 100 occupied by users with the door 105 in a fully closed position.

The catastrophic event survival structure 100 includes a monolithic outer shell 150 as shown. The monolithic outer shell may be shaped in any of a wide variety of shapes and sizes without departing from the present invention. In the exemplary configuration illustrated in the figures, the monolithic outer shell 150 of the catastrophic event survival structure 100 is shaped as a generally spherical polyhedron. It will be appreciated by those skilled in the art that the generally spherical polyhedron configuration of the monolithic outer shell 150 assists in minimizing the total area of each planar surface of the catastrophic event survival structure 100 for increased structural strength and impact durability. In the preferred embodiment, the monolithic outer shell 150 will have a generally aerodynamic outer configuration, as shown, to minimize the effect of high velocity wind forces during severe weather conditions. Additionally, the generally spherical polyhedron configuration results in substantially gradual angles between adjoining sides and thereby avoids the typical 90-degree corner and right angle edge configuration often associated with susceptible failure regions in conventional structures.

In a most preferred embodiment, the monolithic outer shell 150 will include a relatively horizontal top panel 110 and a relatively horizontal bottom panel 120 as shown. A number of generally vertical sidewalls 130 will be included as shown. In a most preferred embodiment, a total of eight generally vertical sidewalls 130 will be utilized. It will be appreciated by those skilled in the art, however, that any number of generally vertical sidewalls 130 can be included without departing from the present invention. As shown, the monolithic outer shell 150 will also include a number of generally inclined upper panels 112 extending from the top panel 110 to the sidewalls 130. Although any number of generally inclined upper panels 112 may be utilized without departing from the present invention, in a most preferred embodiment, the monolithic outer shell 150 of the catastrophic event survival structure 150 will include eight generally inclined upper panels 112.

As shown, the monolithic outer shell 150 will also include a number of generally inclined lower panels 122 extending from the bottom panel 120 to the sidewalls 130. Although any number of generally inclined lower panels 112 may be utilized without departing from the present invention, in a most preferred embodiment, the monolithic outer shell 150 of the catastrophic event survival structure 100 will include eight generally inclined lower panels 112

In the preferred embodiment of the catastrophic event survival structure 100, a door 105 will be provided for easy access into and out of the monolithic outer shell 150. A wide variety of different configurations may be utilized for the door 105. In a most preferred embodiment, one of the generally inclined lower panels 122 of the monolithic outer shell 150 may be configured as a door 105 as depicted in FIGS. 1 and 2. Alternatively, the door 105 may be formed elsewhere, such as in the generally horizontal top panel 110 or bottom panel 120, for example, of the monolithic outer shell 150. Having the door 105 configured in the top panel 110 of the monolithic outer shell 150 may be desirable in instances where placement in a generally inclined lower panel 122 is impractical such as, for example, when the catastrophic event survival structure 100 is placed substantially underground. The door 105 of the catastrophic event survival structure 100 may be formed from any of a wide variety of materials without departing from the present invention. In the preferred embodiment, the door 105 will be constructed from a high strength metal, such as steel, so that it is able to resist substantial wind and projectile impact forces. As shown in FIG. 1, the door 105 may be configured to open via a hinge and be provided with a number of steps 106 on an inside surface to facilitate easier entry and exit. Additionally, a window 108 may be included for use by occupants of the catastrophic event survival structure 100. If a window 108 is included in the door 105, it will preferably be configured of a clear yet substantially strong bulletproof material.

The monolithic outer shell 150 of the catastrophic event survival structure 100 of the present invention will be formed of a substantially strong concrete mixture to enable it to withstand a variety of high-velocity wind and projectile impact forces without failure. Furthermore, in a most preferred embodiment, the outer shell 150 of the catastrophic event survival structure 100 will be configured as a single continuous monolith. As such, in the most preferred embodiment, there will not be any joints within the monolithic outer shell 150 that can weaken its structural integrity. Likewise, the monolithic outer shell 150 of the present invention will preferably be formed from one continuous pour of concrete as will be described in more detail herein. In a most preferred embodiment, the monolithic outer shell 150 will be generally around a foot in thickness. It will be appreciated by those skilled in the art, of course, that the thickness of the monolithic outer shell 150 can vary considerably without departing from the present invention.

The monolithic outer shell 150 of the catastrophic event survival structure will preferably be in contact with a permanent inner mold surface 190 as shown in the figures. The permanent inner mold surface 190 will be configured along an inside surface of the monolithic outer shell 150 and is preferably formed of a fiberglass material. The permanent inner mold surface 190 plays an important role in the manufacturing of the catastrophic event survival structure 100 and will be described in more detail herein.

Figure 4:
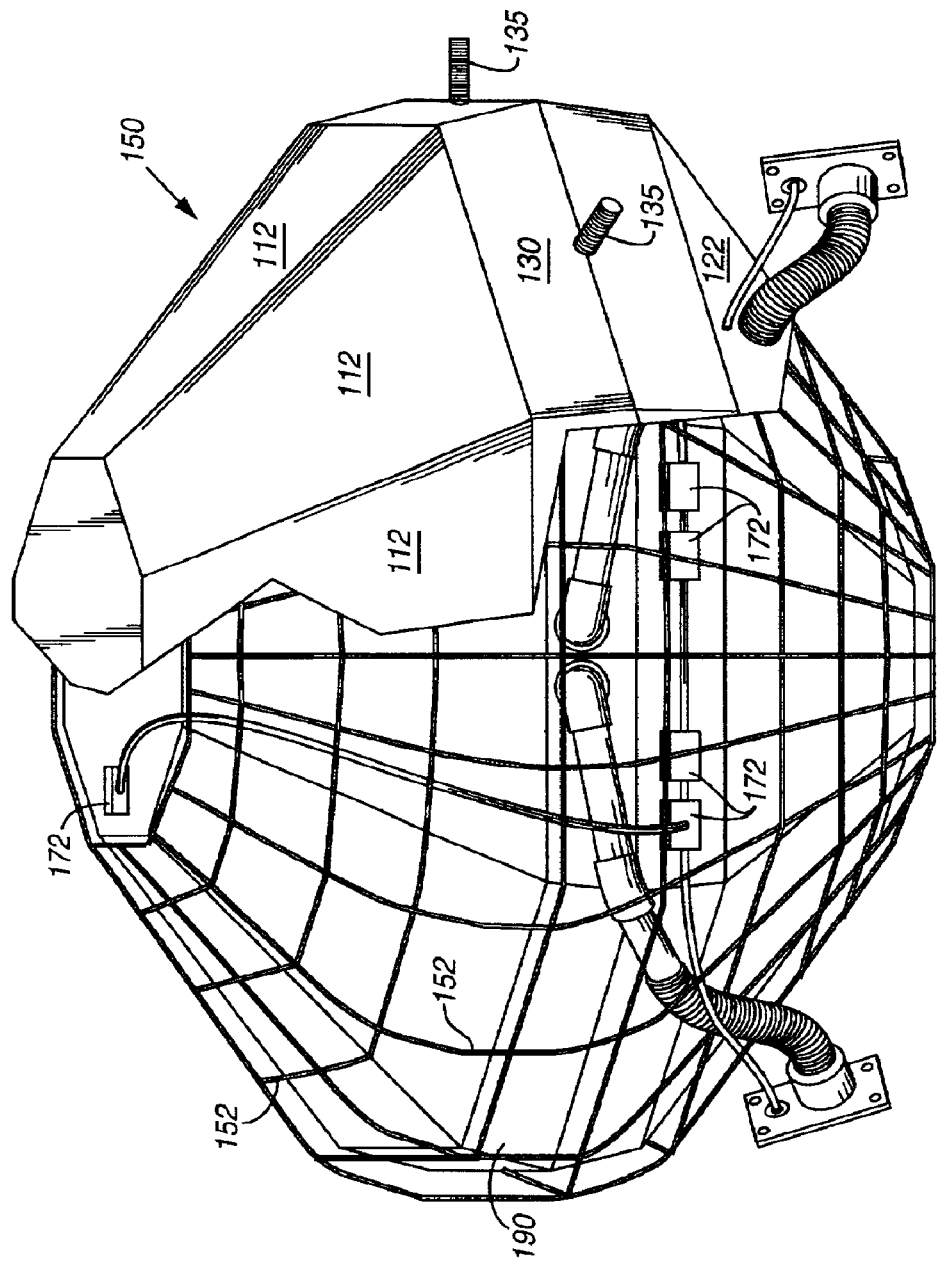
FIG. 4 is a perspective view of the catastrophic event survival structure with the monolithic outer shell partially cut-away to show underlying details in accordance with an exemplary embodiment of the present invention.

As will be appreciated by those skilled in the art, the outer shell 150 of the catastrophic event survival structure of the present invention may include reinforcing material selectively embedded within the concrete mixture for added tensile strength. For example, a quantity of fiberglass reinforcing material may be added to the concrete mix in order to increase its tensile strength. Additionally, in the preferred embodiment, the monolithic outer shell 150 will be reinforced by steel rebar 152 evenly distributed throughout the catastrophic event survival structure 100 as best shown in FIG. 4. A wide variety of different types of steel rebar 152 may be utilized without departing from the present invention. In a most preferred embodiment, the thickness of the steel rebar will vary between ⅝ to ¾ inches throughout the catastrophic event survival structure 100.

Figure 3:
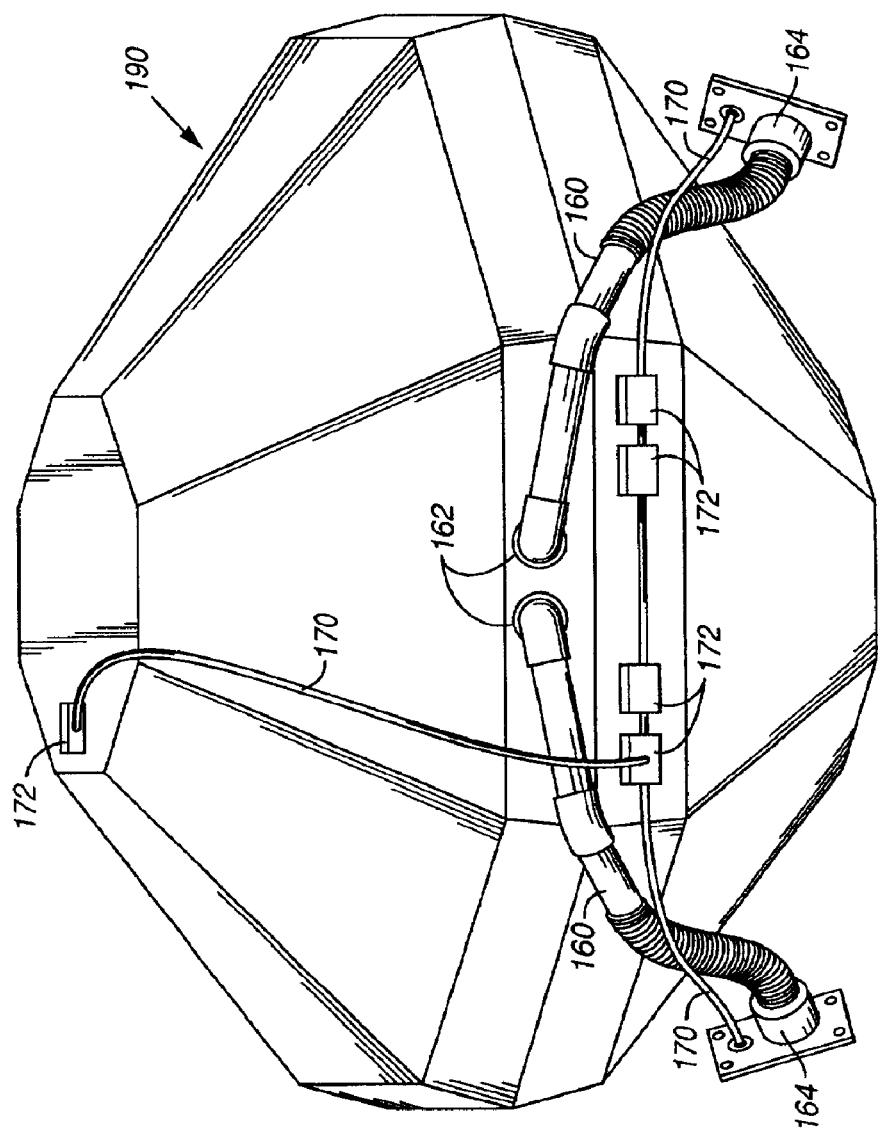
FIG. 3 is a perspective view of an incomplete catastrophic event survival structure showing the permanent inner mold surface with the electrical wire and outlet system and air conduits in place in accordance with an exemplary embodiment of the present invention.

The catastrophic event survival structure 100 of the present invention will preferably include ventilation means configured to provide adequate air circulation in the confined space within the monolithic outer shell 150. In the preferred embodiment, the ventilation means will include air conduits 160 extending from inside the catastrophic event survival structure 100, all the way through the monolithic outer shell, and opening to the outside environment. In the preferred embodiment, two air conduits 160 will be utilized as best shown in FIG. 3. FIG. 3 is a perspective view of a catastrophic event survival structure before addition of concrete and illustrates one way of placing the air conduits 160. As shown, the air conduits 160 permit air to freely travel from an inner vent 162 to an outer vent 164 as desired. The outer vent 164 preferably extends completely outside the monolithic outer shell 150 of the catastrophic event survival structure as depicted in FIG. 4. FIG. 4 is a perspective view of the catastrophic event survival structure 100 with the monolithic outer shell 150 partially cut away to show details therein such as placement of the air conduit 160. If desired, the air conduits 160 may be configured for use with a conventional blower unit 166, as shown in FIG. 2, to facilitate movement of air into and out of the confined space within the catastrophic event survival structure 100. The blower unit 166 may be provided with a fan for each air conduit 160, if desired, to maximize air circulation. Of course, it will be appreciated by those skilled in the art that the air conduits 160 and the blower unit 166 shown are for illustrative purposes only and any of a wide variety of known blower unit 166 and air conduit 160 configurations may be utilized without departing from the present invention.

The catastrophic event survival structure 100 of the present invention may include electrical power means to provide a ready supply of electrical power. As will be appreciated by those skilled in the art, a wide variety of electrical power means may be utilized for this purpose without departing from the present invention. In the preferred embodiment, the electrical power means will be an electrical wiring and outlet system including electrical wire 170 and outlets 172 distributed throughout the catastrophic event survival structure 100 as best shown in FIG. 3. The outlets 172 may be conventional outlets having a housing and plug receiving openings therein and should be configured for easy access from within the catastrophic event survival structure 100. In the preferred embodiment, the electrical power means will be configured to receive power from an external source, such as through a conventional power cord, for example, or through underground or overhead utility power lines. As shown in FIG. 2, a conventional power cord 174 may be utilized to supply external power to the catastrophic event survival structure. Additionally, the electrical power means may also include a back-up battery 176 for use in instances where the primary power supply is interrupted during a catastrophic event such as, for example, an earthquake, tornado, hurricane, military strike, or other power-interrupting event.

Figure 6:
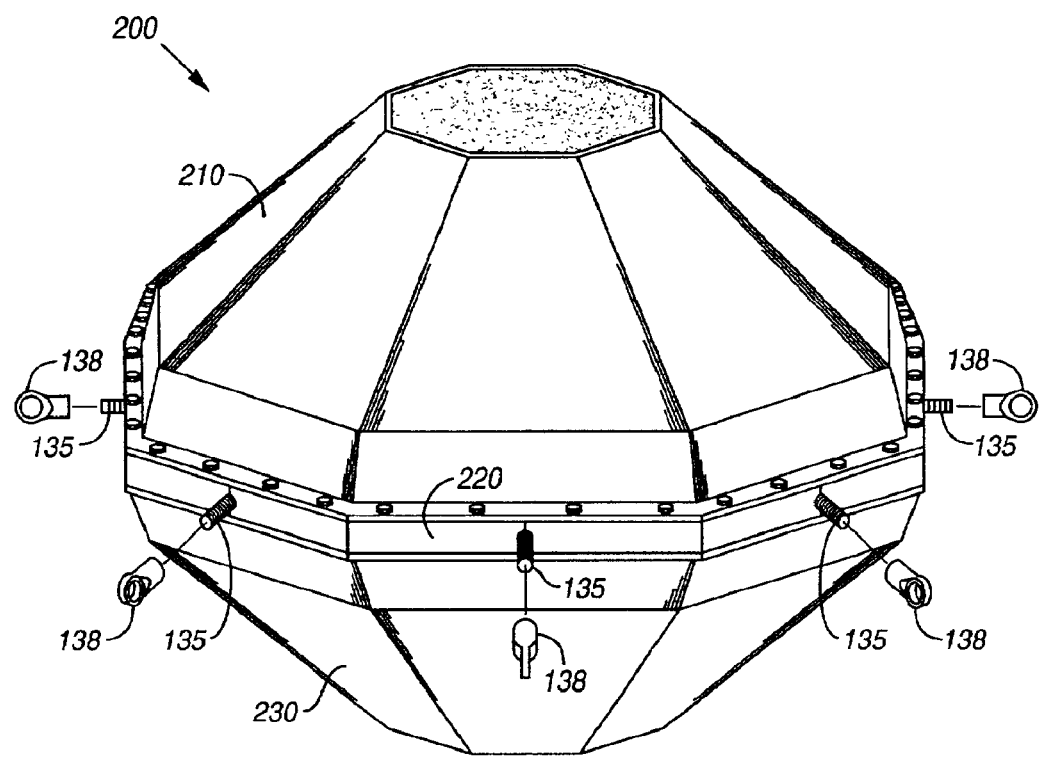
FIG. 6 is a perspective view showing the top portion, spacing element, and bottom portion of the removable outer mold in place about the permanent inner mold surface.

The catastrophic event survival structure 100 of the present invention can be configured to be portable and can be utilized in a wide variety of configurations including below ground, at the ground surface, and in an above-ground elevation without departing from the present invention. Additionally, it will be appreciated by those skilled in the art that the catastrophic event survival structure 100 can be easily configured, using known methods, for use in a variety of applications requiring the structure 100 to be completely submerged under water. This may be desirable where the catastrophic event survival structure 100 is utilized, for example, in military naval operations or for marine or oceanographic research purposes. In order to assist in transporting the catastrophic event survival structure 100, handle means may be provided. In the preferred embodiment, the handle means will comprise a number of rods 135 embedded into the concrete structure of the monolithic outer shell 150 as shown in the figures. The rods 135 preferably extend from a point outside the catastrophic event survival structure 150 all the way through to the permanent inner mold surface 190 so that they form an integral part of the monolithic outer shell 150. As such, it will be appreciated that the rods 135 act as substantially strong handles and can be utilized to lift the catastrophic event survival structure 100 for transport purposes. Lifting and moving the catastrophic event survival structure 100 can be accomplished in a number of different ways through use of the rods 135 including, for example, utilizing a crane to lift the catastrophic event survival structure 100 through chains secured to the rods 135. It will be appreciated by those skilled in the art that the catastrophic event survival structure 100 can be quickly and conveniently transported, as needed, so that it is substantially portable and easy to deploy in emergency situations, such as during a public riot, for example, where time is of the essence. In order to provide a more pleasing aesthetic appearance, the rods 135 of the catastrophic event survival structure 100 may be fitted with a decorative cap 136 as shown in the figures. Alternatively, as shown in FIG. 6, an eyelet 138 may be provided to make lifting and transport convenient.

In the preferred embodiment, elevating means can be utilized if it is desirable to position the catastrophic event survival structure at an elevation above the ground surface. Such an elevation will preferably be sufficient to prevent water from entering the catastrophic event survival structure 100 in the event of a significant rise in the water table such as that commonly encountered during a hurricane.

In the preferred embodiment, the elevating means will comprise a number of legs 180 configured to support the catastrophic event survival structure 100 as shown in the figures. In a most preferred embodiment, four legs 180 will be provided although it will be appreciated that any number of other configurations may also be utilized without departing from the present invention. Depending upon specific soil conditions at the placement site, a foundation footing 184 may also be utilized, if desired, to support the legs 180 as shown in FIGS. 1–2. In the preferred embodiment, the foundation footing, if needed, will be formed of concrete.

The legs 180 of the catastrophic event survival structure 100 may be formed of any of a wide variety of materials without departing from the present invention. In the preferred embodiment, the legs will be formed of high strength steel. Preferably, at least two of the legs will be formed in a hollow configuration to permit access for electrical wire 170 and air conduits 160 therein. As shown, the air conduits 160 and electrical wire 170 may be configured to extend outside the monolithic outer shell 150 of the catastrophic event survival structure 100 as best shown in FIG. 4. If desired, the air conduits 160 and electrical wire 170 may extend from the monolithic outer shell 150 and into one of the legs 180 as shown. In a most preferred embodiment, the leg 180 will be provided with a vent-covered opening 182 to permit air to freely enter the leg 180. Air conduits 160 may be secured to the interior surface of the leg 180 at a position adjoining the vent-covered opening so that air may freely enter and exit the air conduits 160. Electrical wire 170 may extend through the leg 180 to an outlet placed on an external wall of the leg 180 configured to receive electrical power from a conventional power cord 174 as shown generally in FIG. 2.

Now that the catastrophic event survival structure 100 of the present invention has been described, an illustrative method of manufacturing the structure will be explained. In order to construct the catastrophic event survival structure 100 of the present invention, a mold must first be constructed that is capable of receiving concrete sufficient to form the monolithic outer shell 150 during one continuous pour of concrete. As discussed previously, it is important to minimize joints within the monolithic outer shell 150 that may weaken its structural integrity.

Figure 5:
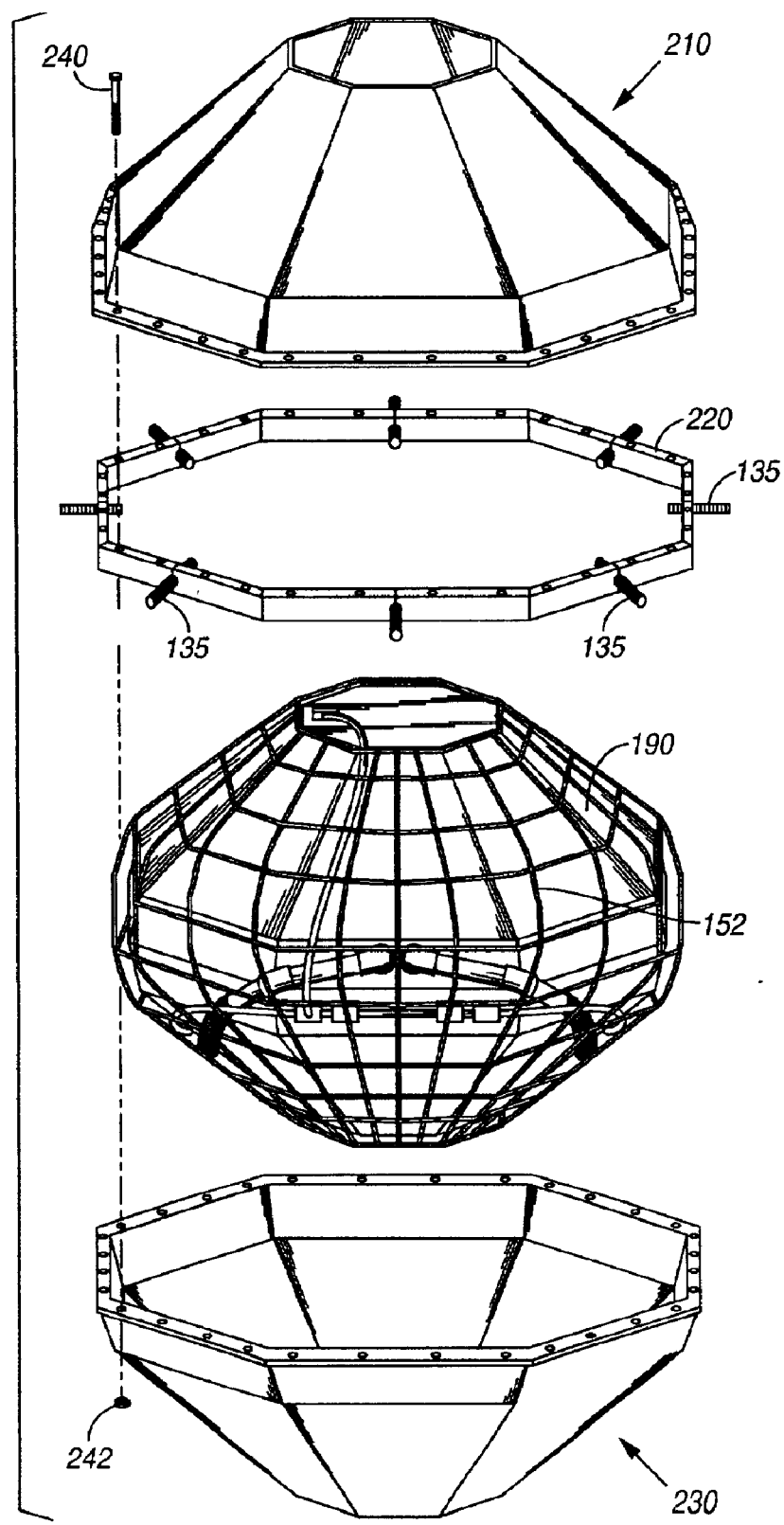
FIG. 5 is an exploded perspective view of an incomplete catastrophic event survival structure showing the top portion, spacing element, and bottom portion of the removable outer mold before it is secured about the permanent inner mold surface in accordance with an exemplary embodiment of the present invention.

Initially, it will be necessary to construct a permanent inner mold surface 190 as best shown in FIG. 3. The inner mold surface 190 may be formed of any of a wide variety of known materials and configurations without departing from the present invention. It is important, however, that the permanent inner mold surface 190 is of sufficient strength to withstand the force of concrete comprising the monolithic outer shell 150 while the concrete is curing. In a most preferred embodiment, the inner mold surface 190 will be formed of fiberglass panels as best shown in FIG. 3. Once the inner mold surface 190 has been constructed, steel rebar 152 can be installed in an evenly distributed manner about the inner mold surface 190 as illustrated in FIGS. 4 and 5. At this point, the air conduits 160, electrical wire 170, and electrical outlets 172 can be installed as best shown in FIG. 3. As shown, an inner vent 162 can be provided on the inner mold surface 190 in communication with each of the air conduits 160 to permit air to enter and exit the confined space within the catastrophic event survival structure 100. If desired, an opening for the door 105 may now be cut into the inner mold surface 190.

At this point, a removable outer mold surface 200 can be constructed. The removable outer mold surface 200 should be positionable a spaced-apart distance around the permanent inner mold 190 so as to leave a concrete-receiving void therebetween. In the preferred embodiment, the removable outer mold surface 200 includes a separable top portion 210, a spacing element 220, and a separable bottom portion 230 as best shown in the exploded perspective view of FIG. 5. In FIG. 5, the separable top portion 210, spacing element 220, and separable bottom portion 230 are shown before they are secured about the permanent inner mold surface 190 in accordance with an exemplary embodiment of the present invention. FIG. 6 shows the separable top portion 210, spacing element 220, and separable bottom portion 230 secured about the permanent inner mold surface 190. As shown in FIGS. 5–6, the separable top portion 210, spacing element 220, and separable bottom portion 230 may be held together by securing means. Although a wide variety of securing means may be utilized, in the preferred embodiment, the securing means includes a bolt 240 and nut 242 extending through openings in the removable outer mold surface 200. The removable outer mold surface 200 may be constructed from a wide variety of materials without departing from the present invention. In the preferred embodiment, the removable outer mold surface 200 will be formed of a high strength metallic material such as steel or aluminum. As shown in FIG. 5, a number of rods 135 can be positioned in the spacing element as shown. In the preferred embodiment, the outer surface of the rods 135 will be threaded so as to engage in an opening in the spacing element 220. As such, it will be appreciated that the depth of insertion of the rod 135 within the spacing element 220 can be adjusted by selectively turning the rod within the spacing element 220. Each of the rods 135 will preferably extend inwards from the removable outer mold surface 200 all the way through to the outside surface of the permanent inner mold surface 190. As such, it will be appreciated by those skilled in the art that the rods 135 can be turned, as desired, to strategically position the permanent inner mold surface 190 within the removable outer mold surface 200. In the preferred embodiment, the depth of each of the rods 135 will be adjusted to generally center the permanent inner mold surface 190 within the removable outer mold surface 200 so as to leave a generally symmetrical concrete-receiving void for forming the monolithic outer shell 150 of the catastrophic event survival structure 100.

Once the permanent inner mold surface 190 and the removable outer mold surface 200 are in place and positioned a spaced-apart distance from each other, the monolithic outer shell 150 is ready to be cast. At this point, concrete can be poured into a top end of the concrete-receiving void between the inner mold surface 190 and the outer mold surface 200. The concrete is then cured for a number of days, preferably seven to ten, until the monolithic outer shell 150 is structurally sound without the removable outer mold 200 in place. At this point, the removable outer mold 200 is carefully removed and the monolithic outer shell 150 of the catastrophic event survival structure is permitted to cure for another 20 days or so. Once the concrete is sufficiently cured, the monolithic outer shell 150 may be grinded down, primed, and painted as desired. The legs 180 of the catastrophic event survival structure 100 may now be secured to the monolithic outer shell 150, as shown in FIG. 1, by utilizing a number of bolts 186 extending into the monolithic outer shell 150 as illustrated. Of course, it will be appreciated by those skilled in the art that any of a wide variety of other methods may be used to secure the legs 180 of the catastrophic event survival structure 100 to the monolithic outer shell 150 without departing from the present invention. At this point, the electrical wire 170, air conduit 160, and other optional connections within the legs 180 of the catastrophic event survival structure 100 can be completed and the interior finishing, seating, lighting, and door 105 can all be assembled and installed as desired. Any of a variety of other known accessories may also be provided, as desired, for added safety, convenience, and comfort with departing from the present invention.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

I claim:

1. A catastrophic event survival structure, comprising:
    a monolithic concrete outer shell comprising a unitary jointless body having a generally spherically polyhedron geometry, said monolithic concrete outer shell further comprising reinforcement members embedded therein and having at least one open section extending therethrough, but otherwise defining a substantially enclosed interior space;
    flat surfaced panels substantially forming the inner shell which is used as a mold surface for the outer shell;
    at least one entryway door in sealing engagement with said at least one open section to provide resealable access to said substantially enclosed interior space; and
    a support stand engaging said survival structure and configured to maintain said monolithic concrete outer shell a distance above a survival structure-supporting surface.

2. A catastrophic event survival structure as recited in claim 1, further comprising handle means fixedly secured to said monolithic concrete outer shell.

3. A catastrophic event survival structure as recited in claim 2, wherein said handle means further comprises a plurality of horizontally-disposed rods in spaced-apart relation to each other and extending through said monolithic concrete outer shell.

4. A catastrophic event survival structure as recited in claim 1, wherein said support stand further comprise a plurality of legs secured to said monolithic concrete outer shell.

5. A catastrophic event survival structure, comprising:
    an inner shell having a generally spherical polyhedron geometry;
    reinforcement members arranged substantially about the inner shell;
    a monolithic concrete outer shell about the reinforcement members forming an exterior barrier to the structure, the inner shell being a mold surface for the monolithic concrete outer shell;
    flat plate members substantially forming the inner shell, wherein the inner shell is a mold surface for the outer shell;
    an opening section through the inner shell, the reinforcement members and the outer shell for allowing entry into the shelter;
    a door for sealingly closing off the opening section portion; and
    a support stand for elevating the structure above a ground surface so that the structure is not prone toward flooding.

6. A catastrophic event survival structure of claim 5, wherein the reinforcement members include:
    separate longitudinal bar members in arranged in a cage configuration laying over the inner shell so that the bar members are imbedded substantially throughout the monolithic concrete outer shell.

7. A catastrophic event survival structure of claim 5, wherein the support stand includes:
    a plurality of legs secured to the monolithic concrete outer shell for elevating the structure above the ground surface so that the structure is not prone to flooding.

8. A catastrophic event survival structure of claim 7, further comprising:
    concrete footers on bottoms of each of the legs forming a footing foundation for the structure on the ground surface so that the legs elevate the structure above the ground surface.

9. A catastrophic event survival structure of claim 7, further comprising:
    a conduit within at least one of the legs for protecting and running an air supply and power supply that is connected to the structure.

10. A catastrophic event survival structure of claim 1, wherein the inner shell includes:
    inclined upper flat surfaced panels; and
    inclined lower flat surfaced panels.

11. A catastrophic event survival structure of claim 1, wherein the outer shell includes:
    a perimeter surface of flat surfaced shapes.

12. An aboveground catastrophic event survival structure assembly, comprising:
    an inner permanent mold shell having a generally spherical polyhedron geometry shape;
    a removable upper section substantially encompassing an upper portion of the inner permanent mold shell;
    a removable lower section substantially encompassing a lower portion of the inner permanent mold shell;
    a poured concrete material layer located between the inner mold surface and the removable upper and lower sections, the concrete material layer forming a monolithic jointless concrete shell about the inner permanent mold shell; and
    reinforcement members embedded substantially throughout and within the concrete material layer, wherein the structure assembly is used above a ground surface.

13. A catastrophic event survival structure assembly of claim 12, further comprising:
    an opening section through the concrete material layer and the inner permanent mold shell for allowing human entry into the structure; and
    a door for sealing closing off the opening section.

14. A catastrophic event survival structure assembly of claim 12, wherein the reinforcement members includes separate longitudinal members forming a cage frame about the inner permanent mold shell.

15. A catastrophic event survival structure assembly of claim 12, further comprising:
    a support stand for elevating the structure above a ground surface so that the structure is not prone to flooding.

16. A catastrophic event survival structure assembly of claim 15, wherein the support stand includes:
    a plurality of legs secured to the monolithic concrete outer shell for elevating the structure above the ground surface so that the structure is not prone to flooding.

17. A catastrophic event survival structure of claim 16, further comprising:

concrete footers on bottoms of each of the legs forming a footing foundation for the structure on the ground surface so that the legs elevate the structure above the ground surface.

18. A catastrophic event survival structure of claim 16, further comprising:

a conduit within at least one of the legs for protecting and running an air supply and power supply that is connected to the structure.

19. A catastrophic event survival structure, comprising:

an inner shell having a generally spherical polyhedron geometry;

reinforcement members arranged substantially about the inner shell;

a monolithic concrete outer shell about the reinforcement members forming an exterior barrier to the structure, the inner shell being a mold surface for the monolithic concrete outer shell;

an opening section through the inner shell, the reinforcement members and the outer shell for allowing entry into the shelter;

a door for sealingly closing off the opening section portion;

a support stand for elevating the structure above a ground surface so that the structure is not prone toward flooding, the support stand having a plurality of legs secured to the monolithic concrete outer shell for elevating the structure above the ground surface so that the structure is not prone to flooding; and a conduit within at least one of the legs for protecting and running an air supply and power supply that is connected to the structure.

* * * * *